UNITED STATES PATENT OFFICE.

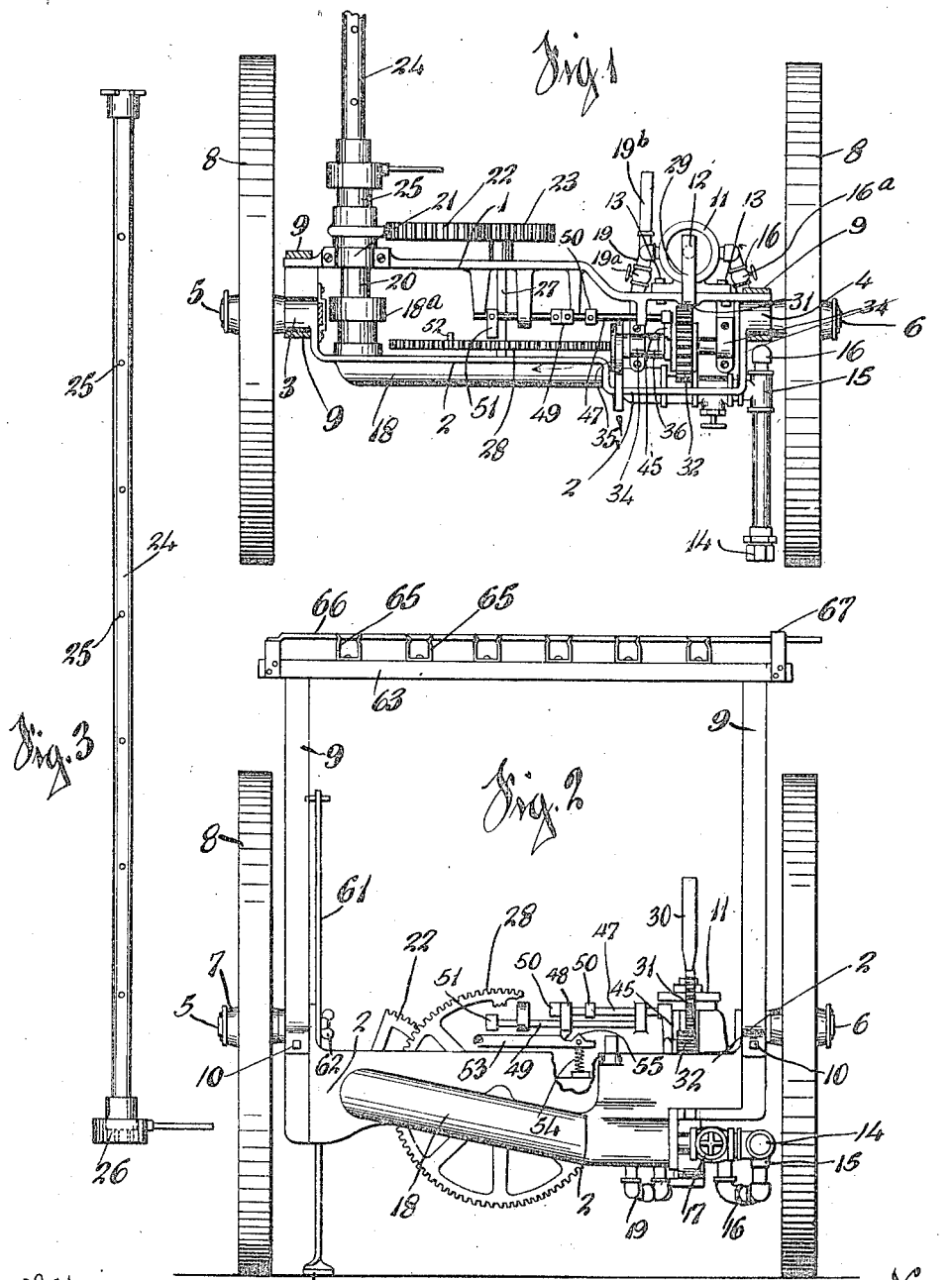

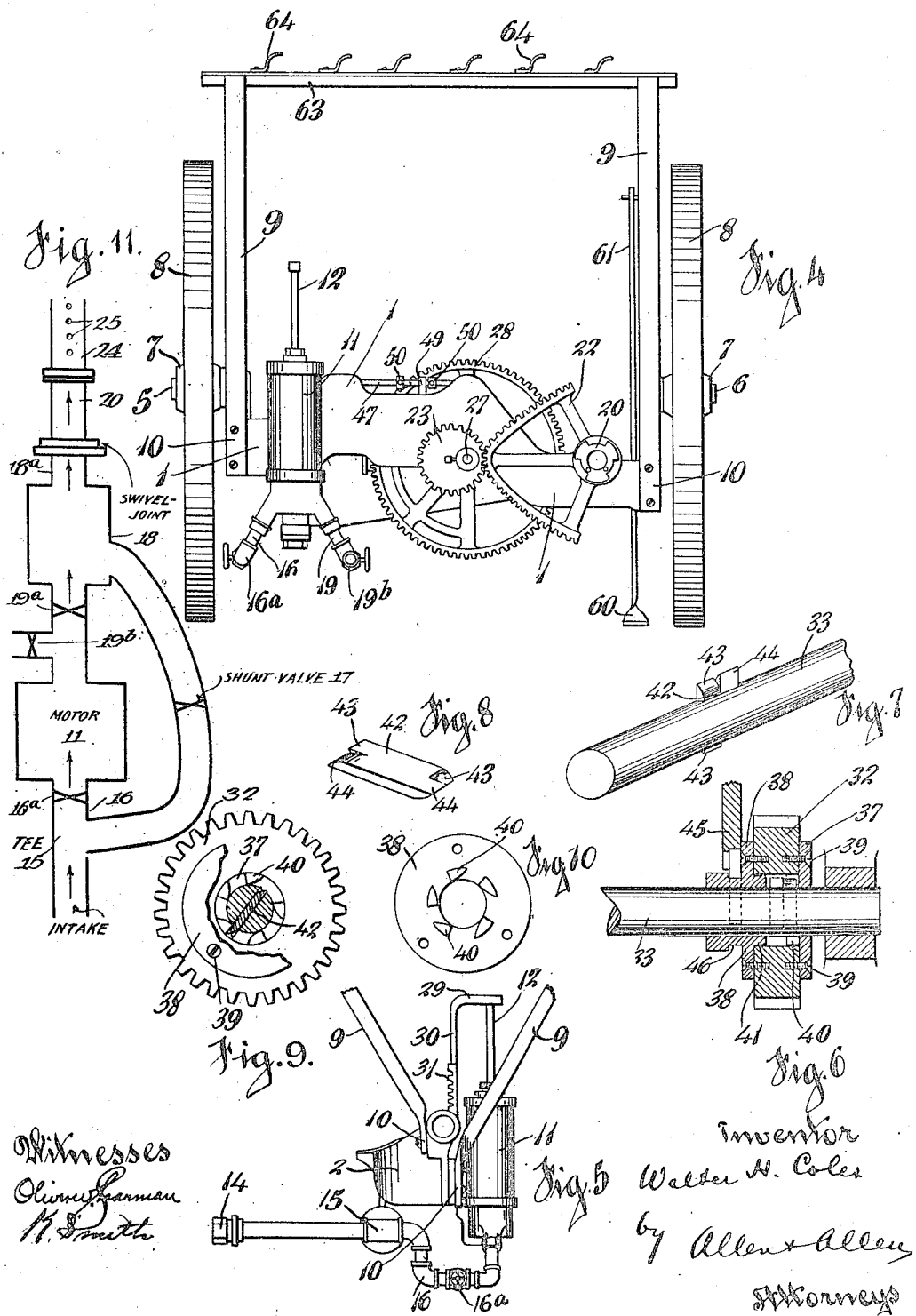

WALTER H. COLES, OF TROY, OHIO.

IRRIGATION DEVICE.

1,167,629.  Specification of Letters Patent.  Patented Jan. 11, 1916.

Application filed October 17, 1914.  Serial No. 867,077.

*To all whom it may concern:*

Be it known that I, WALTER H. COLES, a citizen of the United States, and a resident of the city of Troy, in the county of Miami and State of Ohio, have invented certain new and useful Improvements in Irrigation Devices, of which the following is a full, clear, and exact description, reference being had to the accompanying drawings, forming part of this specification.

My invention has relation to irrigation systems where a long pipe having a series of spray nozzles therein, all set in the same radial plane, is supplied with water and slowly rocked to distribute the water evenly over the surface to be irrigated in the form of a rain. It has been discovered that in imparting the revolving motion to such a pipe, not only must the motion be slow and automatically reversible, but it must also be variable. This is because as the pipe is revolved sending the nozzles around in an arc of say one hundred and twenty degrees, the lines taken by the jets will be in arches of varying height away from the pipe to the ground and their path over the ground will be greater per unit of motion of the nozzles as their angle approaches the perpendicular to the surface of the ground, because as the paths of the jet of water approach the parallel to the surface of the ground, they will not carry as far as at greater angles, due to the varying height of the arches or arcs described. Accordingly in systems of irrigation of this nature, means must be provided for speeding up their motion as the angle of the nozzles comes nearer to the horizontal and slowing it up as it approaches the vertical, in order to get an evenly distributed spray.

The object of my invention is, stated generally, to provide, for the purposes of irrigation as above, a compact and self-contained structure so as to be within the means and fully open to the use of the small scale irrigator who has no source of power except his water pipes and to embody portability therein where practical. To do this, it has been my effort to construct, as will be hereinafter more specifically pointed out and claimed, in the first place, a small, variable motion, reversible water actuated power plant; in the second place, a means of using but one supply water source for motor actuation and irrigation water supply whereby simply valves control the water distribution; and in the third place, an arrangement whereby the whole device is mounted on a portable carriage, preferably on wheels, the same giving proper support to the irrigation pipe, and proper support to the means for actuating it as described and supplying it with water in desired quantities. It is readily to be seen that with such a system, a man with no supply but a hydrant and hose can have an irrigating system for his lawn and garden, by merely wheeling the device to the desired place, setting up the pipes, coupling up his hose, adjusting the valves and turning on his water at the hydrant. This has never before been available in any form to the small user, all devices being large and expensive, or consisting in a single nozzle, or else not self-operating and turning.

The feature of using a water motor (a double-acting motor is preferred) would be valuable to any irrigation system, because it requires no further power supply than that required by a hose, and the same water is usable for irrigating after actuating the motor, but in a self-contained system it is particularly valuable because any other form of power would be available only with difficulty.

In the drawings, Figure 1 is a top plan view of the system, partly in section. Fig. 2 is a rear elevation of the same. Fig. 3 is one of the pipes. Fig. 4 is a front elevation of the device. Fig. 5 is a side elevation of the motor, detached. Fig. 6 is a vertical, longitudinal, sectional detail of the reversible driving means from the motor rack arm to the driving shaft. Fig. 7 is a detail perspective of the driving shaft showing the pawl therein. Fig. 8 is a perspective of the pawl. Fig. 9 is a transverse vertical section of the driving shaft, showing the teeth on the shaft and the teeth inside the toothed gear. Fig. 10 is a plan view of one of the cover plates which screw onto the toothed gear, detached and turned with its ratchet teeth up. Fig. 11 is a diagrammatic view of the arrangement of pipes.

The body portion or framework of the carriage consists of the irregular shaped piece of metal forming the front 1 and back 2 of a casing for mounting the different parts. These casing pieces come together at each side and form the proper boxes 3 and 4 for securing axles 5 and 6. On the axles are mounted the hubs 7, 7 of carrying wheels 8, 8. Angle irons 9, 9, arranged in pairs, are secured at 10, 10 to the pieces 1 and 2, and the members of each pair are bent to spread away from each other, so as to receive the pipe carrying rack to be hereinafter described.

A water motor 11, having a piston rod 12, is preferably bolted at 13, 13 (Fig. 1) to the casing piece 1, so that the piston rod reciprocates vertically. The water intake which is preferably a single one, 14, runs into a T 15, where one branch 16 goes to the water motor and the other branch through a valve 17, and a chamber 18 formed in the casing piece 2. The outlet pipe 19 from the motor also runs into this chamber 18. In the outlet 18ª (Fig. 1) to the chamber 18 is placed, and suitably retained and packed against leakage, a horizontal revoluble pipe 20, said pipe mounted on the casing piece 1 by means of a small journal plate 21 corresponding to a journal depression made in said casing. Secured fixedly to the pipe 20 is the irregularly shaped cam gear 22, whose teeth mesh with those of an eccentric gear 23, for the purpose of giving variable oscillating motion to the pipe 24 secured to the end of the pipe 20. The rigid coupling of the irrigating pipe 24 (Fig. 3), having the series of nozzles 25 customary in irrigating systems of the kind noted, is accomplished by providing some such coupling device 26 as that shown in my patent application Serial No. 857803. When the nozzles 25 are disposed vertically, the gears should be at position of greatest ratio of speed-reduction. The eccentric gear 23 is mounted on a horizontal shaft 27, above the end thereof, which is journaled in the casing and carries a large gear 28 at its other end. The motor has connections whereby it turns the gear 28. This gear operates the eccentric 23, and thence the cam 22, thereby imparting variable motion to the irrigating pipe.

Depending from a small cross head 29 secured onto the piston rod of the motor, is a vertical rack bar 30 having teeth 31. These teeth mesh with those of a gear 32, which is slidably mounted on a shaft 33 mounted in journals 34 formed preferably by cross arms on the casing, and small journal plates screwed thereover. Secured in fixed relation at one end of the shaft 33 is a worm wheel 35, the worm being on the side face of the wheel and meshing with the gear teeth on the large gear 28. The shaft 33 has also a collar 36 to prevent shifting of the shaft in one direction while the worm wheel prevents shifting in the other direction. The loose gear 32, actuated by the rack 31 on the motor piston rod, is turned first in one direction and then the other as the piston rod reciprocates. In order to convert this motion into an oscillating movement of lower frequency, the following pawl and ratchet device is employed: The gear 32 is milled out to a considerable extent at the hub, and face plates 37, 38 are mounted on each side of the gear by means of screws 39. At the hub portion of these face plates are sets of teeth 40, 41, turned in the opposite direction to each other, that is, with their vertical faces and sloping faces tending in opposite directions. The shaft 33 is slotted, and mounted in the slot in a sliding double pawl 42. This pawl has teeth at each end, the two teeth 43, 43 at one side of the pawl being adapted to contact squarely with teeth 40 in one direction, and the teeth 44, 44 being adapted to contact squarely with the teeth 41 in the other direction.

The gear 32, when in one position axially of the shaft 33, will rotate said shaft during the upward piston stroke, and on the downward stroke internal teeth on the gear will move the pawl 42 out of the way by rounded face contacting with rounded face. When the gear 32 is in its other position axially of the shaft 33, the opposite results occur.

To shift the gear axially of the shaft 33, there is provided a forked arm 45 engaging in a groove 46 (Fig. 6) in the extended collar portion of the face plate 38. This arm is keyed onto a horizontal sliding rod 47 (Fig. 2) which is itself actuated by an arm 48 fixedly mounted on another horizontal sliding rod 49, and engaging in the stops 50, 50 on the first rod 47. At the end of the rod 49 is a stop 51, which contacts with a lug 52 on the large gear 28. As the gear turns, the rod 49 is pulled over by the lug 52 and by the course explained shifts the gear 32 axially of the shaft 33, thereby accomplishing a reversing of the driving shaft 33.

Inasmuch as the gear 28 turns very slowly, there must be some means of throwing over the gear shifting device. Accordingly the arm 48 (Fig. 2) which as described shifts the sliding rod 47, is extended down and provided with a point. An arm 53, held by a strong compression spring 54, has a pointed nose 55, which, when the parts are slightly shifted, is pushed down by the end of the arm 48. The moment its point passes the end of the arm 48 the arm 53 will snap up, throwing the arm 48 to its full extent and accomplishing a full shifting of the parts.

It can be seen that by my preferred form of motor and transmission as described, I need no crank shaft for the motor, and I need but one train of gears by reason of my preferred pawl and ratchet scheme.

The course of the water through the machine has been covered at the beginning of the specification.

In the intake pipe 16 to the motor is placed a valve 16ª, and in the outlet pipe a valve 19ª, and a faucet 19ᵇ. When the ordinary conditions prevail, the valve 17, which it will be recalled is located in the main water line between the branches to and from the motor, can adequately regulate the speed of the motor and delivery pressure of the water. When the valve 17 is wide open, very little water will go around by way of the motor, and vice versa when the valve 17 is nearly closed. Water pressures being beyond the control of the user of an irrigation system on a small scale such as the one described, it has been found extremely useful to provide further regulating means. When the motor exhaust is sent back into the main line and thus to the sprinkler pipe, it requires much more water pressure than if the exhaust passed out freely upon piston reciprocation. Based on this principle, the valves 16$^a$ and 19$^a$ and the escape faucet 19$^b$ are provided. When the water pressure with the valve 17 open still runs the motor too rapidly, the valve 16$^a$ is adjusted to cut down the pressure at the motor and decrease its speed. On the other hand, when the water pressure with the valve 17 wide open is so low that not enough water goes to the motor, which may be due either to a very long sprinkler pipe being used or one with large spraying nozzles, or else to a falling in the pressure of water at the intake of the device, then the valve 19$^a$ is closed, and the faucet 19$^b$ opened to allow the motor to exhaust freely. This will considerably lower the amount of pressure required to operate the motor at the required speed, and accordingly accomplish the diversion of more water from the main line to the motor. It can be seen that these valves 17, 16$^a$ and 19$^a$ and 19$^b$ permit the operator to preserve the desired speed of the motor, independently of variations of pressure at the intake of the machine, and of pressure required at the sprinkler pipe. In other words, the operator can use in his sprinkler pipe as much water as he chooses, and maintain his motor at a constant speed by regulation of pressures required for a flow through his motor and connections.

A foot 60 (Fig. 2) mounted on a sliding bar 61, on the framework of the device, is held up away from the ground by the clamping screw 62, and can readily be let down to rest on the ground and hold the carriage stationary when in operation. Placed on the top of the framework is a table for carrying sections of pipe, consisting preferably of three cross bars 63. At the forward or outlet end of the machine, single fingers 64 are mounted on the cross bar, and at the rear end there are spring fingers 65, in pairs. The pipes are laid against the fingers 64 and snapped between those, 65. To keep the pipe in place, a pivoted bar 66 is provided which is mounted on the rear cross bar, and swings over the pipe across the rack and catches under a spring plate 67 at the other end of the cross bar. This bar 66 keeps the pipe from tipping out of the rack and acts as an auxiliary to the spring fingers 65.

Much attention has been given to specific details of structure. It will be understood that, by merely describing one method or one preferred method of accomplishing one of the purposes of the device now specified, it is not desired to exclude from the general novelty all other mechanically equivalent ways of accomplishing the same function.

It is particularly desired to note that the machine now described is an irrigating machine with all the features of advantage of large, extensive sprinkler systems, and yet self-contained in a real sense. It has an extremely simple method of water operation, and a useful way of employing as a source of power the same water source used for ordinary sprinkling or irrigating.

In operating the machine shown, it is wheeled to the position desired and the hose connection made with the intake 14. The irrigating pipes 24 having been coupled to the machine, the water is then turned on and the spraying continues until the tract of land has been watered to the desired extent, when the apparatus is readily and easily shifted to another position. No further attention need be given the apparatus, the water motor driven by the water for irrigation automatically oscillates the irrigating pipes to effectively and evenly distribute the water.

The use of power in the shape of a reciprocating water motor in a sprinkler system has ordinarily been attended by an oscillation of the line for each reciprocation of the motor. It will be noted that in this device the times of oscillation of the line are utterly independent of the times of reciprocation of the motor and oscillations are obtained by a means independent of the motor or its reversal.

Having thus described my invention, what I claim as new and desire to secure by Letters Patent, is:—

1. An irrigating plant comprising: spraying means including a spraying pipe, an intake pipe, a water-motor connected to each of said pipes, means comprising a pipe shunting the motor and provided with a valve, for varying at will the speed of said motor, and means whereby, upon the operation of the motor, said spraying pipe is given an oscillating movement at a speed independent of the rate of water supply to the spraying pipe.

2. An irrigating plant comprising: spraying means including a pipe, a water-motor driven by water which may later pass through said pipe, means operatively connecting said motor and said pipe whereby the operation of the former effects the oscillation of the latter, and means for varying at will the frequency of oscillation of the spraying means without substantially varying the rate of flow of water discharged by the spraying means.

3. An irrigating plant comprising: spraying means including a pipe, a reciprocating water-motor driven by water which later passes through said pipe, connections to convert the reciprocations of the motor into oscillations of the pipe, means for automatically varying the speed of oscillation of the pipe during each cycle of oscillation to maintain constant the rate of travel of the spray over the ground and means for varying the frequency of oscillation of the spraying means at will without substantially varying the rate of flow of water discharged by the spraying means.

4. An irrigating plant comprising: a spraying pipe, a reciprocating water-motor including a piston, means for supplying water to said motor, a waste pipe for the water, control means for passing the exhaust water of the motor through said spraying pipe or through the waste pipe at will, and means whereby the reciprocation of the piston effects an oscillation of the pipes.

5. An irrigating plant comprising: spraying means including a pipe having an oscillating movement, a reciprocating water-motor having a piston, a variable-speed mechanism in operative connection with said piston and pipe whereby the reciprocation of the piston effects the oscillation of the pipe at a speed varying during each oscillation to maintain constant the rate of travel of the spray over the ground, and means for varying at will the speed of the water-motor independently of the rate of flow of water through said pipe.

6. An irrigating plant comprising: spraying means including a water-motor, a perforated pipe, means for conducting the exhaust water of the motor to said pipe, connections between said motor and pipe whereby the operation of the motor effects the movement of said pipe, and means for varying the speed of the motor at will independently of the rate of flow of water through the spraying means.

7. An irrigating plant comprising: spraying means adapted to oscillate, a water-motor having a reciprocating piston, connecting means between the piston and the spraying means for oscillating the latter at a speed proportionate to the speed of reciprocation of the piston, an intake, connections between the intake and the motor and between the motor and the spraying means, and means comprising a valved connection from the intake to the spraying means and shunting the motor, for varying the speed of the piston without substantially varying the rate of flow of water to the spraying means.

8. An irrigating plant comprising: a spraying pipe, an intake pipe, a water motor between the two pipes, a valve in the intake pipe controlling the flow of water to the motor, a valve controlling the flow of water from the motor to the spraying pipe, means for oscillating the spraying pipe from the motor, a shunt pipe from the intake pipe to the spraying pipe around the motor and the valves controlling flow to and from the same, a valve in the shunt pipe for controlling the flow of water therethrough, and means including a valve for exhausting the motor water independently of the spraying pipe.

9. In an irrigating device, a motor, an irrigating pipe, a gear driven directly by the motor, a shaft for said gear, a train of gear for revolving the irrigating pipe, connection from the shaft to the train to impart slow movement thereto, and means for shifting the gear on the shaft, comprising an arm holding the gear, a lug on the gear train, connection between said arm and a finger in the path of the lug, and spring means for throwing over the connection upon partial movement of the finger.

WALTER H. COLES.

Witnesses:
M. T. ROSSITER,
R. R. WHITE.